United States Patent
Stier

(10) Patent No.: US 7,827,506 B2
(45) Date of Patent: Nov. 2, 2010

(54) METHODS AND SYSTEMS FOR OUTPUTTING DATA ON A GRAPHICAL USER INTERFACE OF A COMPUTER SYSTEM

(75) Inventor: Andreas Stier, Malsch (DE)

(73) Assignee: SAP AG, Walldorf (DE)

( * ) Notice: Subject to any disclaimer, the term of this patent is extended or adjusted under 35 U.S.C. 154(b) by 338 days.

(21) Appl. No.: 11/319,379

(22) Filed: Dec. 29, 2005

(65) Prior Publication Data

US 2006/0190463 A1 Aug. 24, 2006

(30) Foreign Application Priority Data

Dec. 29, 2004 (EP) ................. 04030964

(51) Int. Cl.
*G06F 3/048* (2006.01)
(52) U.S. Cl. .................. 715/809; 715/764
(58) Field of Classification Search ........... 707/100; 715/764, 809
See application file for complete search history.

(56) References Cited

U.S. PATENT DOCUMENTS

| | | | | |
|---|---|---|---|---|
| 4,823,283 | A * | 4/1989 | Diehm et al. | 715/825 |
| 6,011,555 | A * | 1/2000 | Eckhoff et al. | 715/843 |
| 2003/0028693 | A1* | 2/2003 | Pasumansky et al. | 710/105 |
| 2004/0080545 | A1* | 4/2004 | Kobal et al. | 345/824 |
| 2005/0229096 | A1* | 10/2005 | Kiesekamp et al. | 715/507 |
| 2006/0107196 | A1* | 5/2006 | Thanu et al. | 715/503 |

OTHER PUBLICATIONS

"Multiline text entry from a combo box", Research Disclosure No. 334049, published Feb. 1992, pp. 1 & 2.*
"Easy access to distribution information", Research Disclosure No. 342044, published Oct. 1992, pp. 1 & 2.*
"Automatic drop-down list boxes", Research Disclosure No. 350024, published Jun. 1993, pp. 1 & 2.*
"Scrollable entry field expander control", Research Disclosure No. 341041, published Sep. 1992, pp. 1 & 2.*
"Sams Teach Yourself Access 97 in 21 Days", by Cassel et al., published by Sams Publishing in 1998, pp. c, i, ii, 42, 43, 66, 67, 85-90, 158-161, 233-236, 250, 277-279.*
Sams Teach Yourself Access 97 in 21 Days, by Cassel et al., published by Sams Publishing in 1998, pp. c, i, ii, 42, 43, 66, 67, 68, 76, 77, 85-90, 118, 127, 158-161, 227, 230, 233-236, 250, 277-279.*

* cited by examiner

*Primary Examiner*—William L Bashore
*Assistant Examiner*—Gregory A Distefano
(74) *Attorney, Agent, or Firm*—Finnegan, Henderson, Farabow, Garrett & Dunner, LLP

(57) ABSTRACT

Methods and systems are provided for outputting data on a graphical user interface of a computer system. Consistent with one implementation, a method of outputting data on a graphical user interface is provided. The method comprises retrieving data descriptive of an object from a data repository, transferring the data as an ordered plurality of rows of data to a drop down list box, and displaying the drop down list box on the graphical user interface. Consistent with another implementation, a method of displaying a screen view on a graphical user interface of a computer system is provided. The method comprises defining a screen element allowing display of data, assigning a drop down list box attribute to the screen element, configuring the screen element to suppress data input to the screen element, and displaying the screen element on the graphical user interface.

15 Claims, 6 Drawing Sheets

Fig. 1

Positionsnummer
Positionstyp
Vorsystem
Produkt
Tarifnummer — 85422141
Warenbeschreibung Speicher, Metalloxidhalbleiter (MOS-Technik) in Form von Mengen und Gewichte
Positionsmenge
Nettogewicht
Bruttogewicht

| Objekte | Werte | Bezeichnung |
|---|---|---|
| Objekt_01 | Wert_01 | Textzeile_01 |
| Objekt_02 | Wert_02 | Textzeile_02 |
| Objekt_03 | Wert_03 | Textzeile_03 |
| Objekt_04 | Wert_04 | Textzeile_04 |
| Objekt_05 | Wert_05 | Textzeile_05 |
| Objekt_06 | Wert_06 | Textzeile_06 |
| Objekt_07 | Wert_07 | Textzeile_07 |
| Objekt_08 | Wert_08 | Textzeile_08 |
| Objekt_09 | Wert_09 | Textzeile_09 |
| Objekt_10 | Wert_10 | Textzeile_10 |
| Objekt_11 | Wert_11 | Textzeile_11 |
| Objekt_12 | Wert_12 | Textzeile_12 |
| Objekt_13 | Wert_13 | Textzeile_13 |
| Objekt_14 | Wert_14 | Textzeile_14 |

Fig. 4

| Objekte | Werte | Bezeichnung |
|---|---|---|
| Objekt_01 | Wert_01 | Textzeile_01 |
| Objekt_02 | Wert_02 | Textzeile_02 |
| Objekt_03 | Wert_03 | Textzeile_01 Textzeile_02 |
| Objekt_04 | Wert_04 | Textzeile_03 |
| Objekt_05 | Wert_05 | Textzeile_05 |
| Objekt_06 | Wert_06 | Textzeile_06 |
| Objekt_07 | Wert_07 | Textzeile_07 |
| Objekt_08 | Wert_08 | Textzeile_08 |
| Objekt_09 | Wert_09 | Textzeile_09 |
| Objekt_10 | Wert_10 | Textzeile_10 |
| Objekt_11 | Wert_11 | Textzeile_11 |
| Objekt_12 | Wert_12 | Textzeile_12 |
| Objekt_13 | Wert_13 | Textzeile_13 |
| Objekt_14 | Wert_14 | Textzeile_14 |

METHODS AND SYSTEMS FOR OUTPUTTING DATA ON A GRAPHICAL USER INTERFACE OF A COMPUTER SYSTEM

TECHNICAL FIELD

The present invention generally relates to the field of data processing and methods and systems for outputting data on a graphical user interface of a computer system. More particularly, the invention relates to methods, systems and computer programs for creating a screen view that allows displaying data in a user-friendly way.

BACKGROUND INFORMATION

Numerous computer program applications involve the creation, management and display of comparatively large amounts of data. Occasionally, there is a desire or need to display comprehensive textual information on a graphical user interface presented on a monitor linked to a computer of a computer system. In the context of this disclosure, the term "textual information" and also the term "text" both not only refer to plain text, but more generally refer to any character string formed of alphanumeric characters, and possibly including special characters, such as periods, colons, asterisks, etc. If the text to be displayed is long, there may be a problem in that a small font size may be required to display the entire text in a single screen view, thus decreasing the legibility of the text. The text may also be split up and displayed in different screen views, making it difficult to hop between different portions of the text. The situation may be particularly inconvenient if a screen view includes a plurality of screen elements that each are to display relatively long text.

As an example, in the field of customs, descriptions of classes of goods or materials may in some cases involve relatively long text, depending on the level of detail of the class description. For customs purposes, products are rated by these classes in order to determine the tariff to be paid when importing the products. Each class is usually assigned a unique class identification number, which, after a certain product has been rated, is typically used in subsequent customs processes for that product. As the class identification number is naturally far less expressive to a user than the textual description of the class, there is often a need in customs-related computer program applications to display the entire text that describes a certain class of goods or materials.

SUMMARY

Embodiments consistent with the present invention relate to systems and methods for outputting data to a graphical user interface or a screen of a display device. Such systems and methods may alleviate one or more of the limitations or disadvantages existing in the related art.

In one embodiment, a method of displaying textual information stored in a data repository on a screen displayed on a display device of a computer system is provided. The method comprises configuring a drop down list box so as to suppress screen input to the drop down list box, assigning portions of the textual information to be displayed to respective fields of the drop down list box, and displaying the drop down list box on the screen so that a first portion of the textual information is visible in a first field of the drop down list box.

In the context of this disclosure, the term "drop down list box" generally refers to a screen element that allows visual output of data on a graphical user interface. In a preferred embodiment, a drop down list box forms a single-column list of text fields having a limited field length. The drop down list box may have a default setting allowing for a screen input by a user selecting the content of one of the text fields (such as with a pointer device). In this case, the drop down list box can function as an input/output field by default. Input and/or output fields may be generally defined as referring to a template or pattern displayed on the graphical user interface and allowing output of data and/or input of data or information by a user using such means as a keyboard and/or a pointer device. Following this definition, an input/output field can allow both data input and data output, while an input field can allow input of data, but no data output, and an output field may allow data output, but no data input. While a simple input and/or output field will typically provide a single fixed-length text field, a drop down list box, in a preferred embodiment of the present invention, can represent a variant of this type of screen field in that it includes a plurality of fixed-length text fields arranged as a list.

Consistent with an aspect of the invention, a screen element defined as a drop down list box may include a control button that can be activated by a user to unfold the drop down list box to visualize all the text fields contained in the drop down list box. In a normal display state, however, the drop down list box may be displayed as being closed to hide all but the first text field of the list of text fields. Activation of the control button may be effected, e.g., through the user operating a pointer device (such as a mouse pointer, track ball, or touch pad). By moving a pointer onto the control button and subsequently clicking a control key on the pointer device or other input device, the drop down list box may unfold (drops down) and display the entire list of text fields.

Consistent with one embodiment, the drop down list box can provide a user-friendly way of displaying long text in a single screen. In the normal display state, the drop down list box may occupy only reduced screen space, allowing for a great many of other screen elements to be visible at the same time. In the event of a user wishing to view the entire text contained in the drop down list box, the user may activate the control button to cause the drop down list box to unfold and reveal its full content.

It has been stated above that a drop down list box may have a default setting as an input/output screen element. If it is desired to display interrelated text portions in the rows of a drop down list box without providing the user the option to make a selection, screen input by the user to the drop down list box can be inhibited. In one embodiment of the present invention, this is achieved by deactivating a screen input attribute of the drop down list box, wherein the screen input attribute, when activated, is effective to allow screen input to the drop down list box. The screen input attribute may be one of a plurality of attributes associated with the drop down list box. By deactivating the screen input attribute it can be ensured that no input is possible via the drop down list box.

Consistent with one embodiment, a screen element may be defined by a type and a number of attributes. Some screen elements may serve the sole purpose of displaying information, while others may permit user interaction. The type can be, e.g., input/output field, push button, frame, check box, status icon, etc. The attributes may allow to define certain features of the screen element. Some attributes may be static and set automatically when defining a screen element. Other attributes may be user-settable. A drop down list box may be one example of a user-settable attribute and may be assignable to input/output fields. Among the static attributes, there may be one or more attributes, such as the following:

a REQUIRED attribute, which, when activated, may allow the user to exit a screen view only after any input fields that are ready for input have been filled by the user;

an INPUT attribute, which can define whether or not a screen element allows user input;

an OUTPUT attribute, which can define whether or not a screen element allows output of information;

an INTENSIFIED attribute, which can be activated to highlight the content of a screen field;

an INVISIBLE attribute, which can be activated to render a screen element invisible; and an ACTIVE attribute, which can define whether or nor a screen element is active (when deactivated, this attribute overrides any contradictory values of the INPUT, OUTPUT and INVISIBLE attributes).

A person of ordinary skill in the art will appreciate that the above list of static attributes is merely exemplary and non-limiting and that other static attributes may be provided for in addition to, or as a replacement of, some or all of the above example attributes.

At runtime of a program for creating a screen, consistent with one embodiment, at least some of the static attributes of a screen element contained in the screen may be accessible in a screen table. A loop instruction referring to the screen table may then allow to temporarily and repeatedly override one or more of the static attributes in the screen table on each creation of the screen. In this way, a drop down list box, which may be defined as an input/output field by default, may be dynamically modified so as to disable or suppress screen input via the drop down list box. In a preferred embodiment of the present invention, the screen input attribute can be a static attribute and can be repeatedly deactivated on each creation of the screen.

According to another embodiment, to speed up the creation of the screen, a buffer table may be provided that is associated with the drop down list box. Prior to creation of the screen, the textual information to be displayed may be retrieved from the data repository and stored in the buffer table so that each portion of the textual information is stored in a respective different line of the buffer table. A key may be assigned to each line of the buffer table, and each key may be assigned to a respective field of the drop down list box. The key can provide a simple means to ensure that the portions of textual information are displayed in their correct order in the drop down list box.

Consistent with aspects of the present invention, the textual information may be stored in the data repository in the required portioned manner for display in the drop down list box. For example, the data repository may be a database having a plurality of individually addressable database table fields with each portion of textual information to be displayed contained in a respective database table field. In an alternate embodiment, however, the textual information may not be stored in a portioned manner in the data repository, but stored, e.g., as a single, comparatively long piece of text or according to a hierarchical tree-like structure. In such a case, provision may be made for an intermediate functional module operable to retrieve the textual information to be displayed from the data repository, portion the retrieved textual information so that every portion of textual information can be equal to or smaller than the size of a field of the drop down list box, and assign a key to each portion of textual information. The key may be useful to write the portions of textual information in their correct order to the fields of the drop down list box.

Embodiments consistent with the present invention further relate to computer-implemented systems for displaying textual information stored in a data repository on a screen displayed on a display device of the system. Such systems may comprise program code arranged to cause a processing means of the system to carry out methods consistent with embodiments of the invention. There can also be provided computer program products, comprising program code arranged to cause a processing means of a computer system to carry out methods consistent with embodiments of the present invention.

Additional objects and advantages of embodiments consistent with the invention will be set forth in part in the description which follows, and in part will be obvious from the description, or may be learned by practice of embodiments of the invention. The objects and advantages of embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain principles consistent with the present invention. In the drawings:

FIG. 1 shows an exemplary screen view including a screen element configured as a drop down list box, consistent with an embodiment of the present invention;

FIG. 2 shows the screen view of FIG. 1 with the drop down list box unfolded, consistent with an embodiment of the present invention;

FIG. 3 shows an exemplary screen view including a plurality of screen elements configured as drop down list boxes, consistent with an embodiment of the present invention;

FIG. 4 shows the screen view of FIG. 3 with one of the drop down list boxes unfolded, consistent with an embodiment of the present invention;

DETAILED DESCRIPTION

Figure 5:
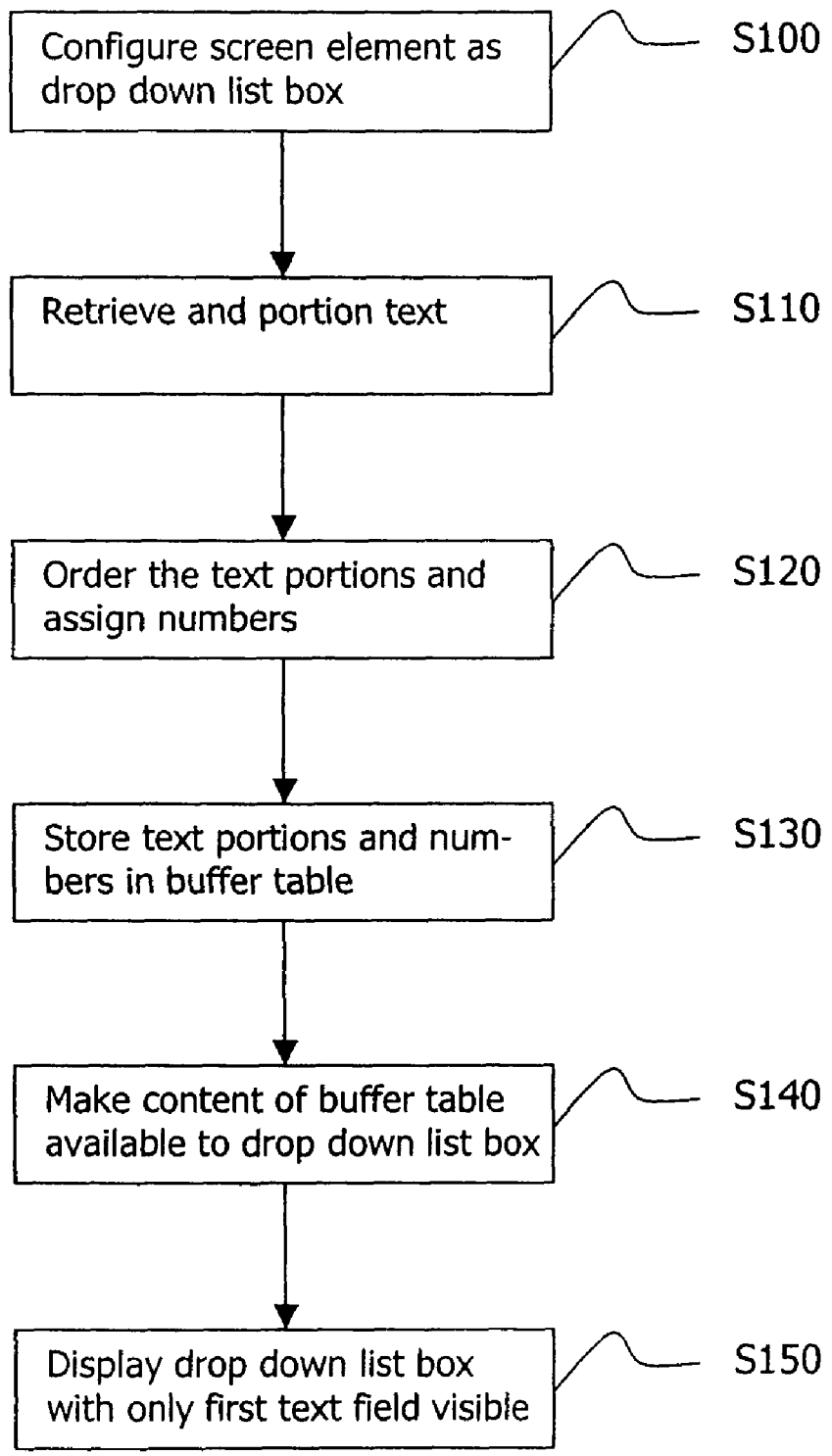
FIG. 5 illustrates a flow chart of an exemplary method, consistent with an embodiment of the present invention.

Reference will now be made in detail to embodiments of the invention, examples of which are illustrated in the accompanying drawings. Wherever possible, the same reference numbers will be used throughout the drawings to refer to the same or like parts.

An exemplary screen view is generally designated 10 in FIG. 1. Screen view 10 includes a plurality of text fields 12 displaying pre-defined descriptors such as "Positionsnummer" (position number), "Positionstyp" (position type), etc. Screen view 10 can further include a plurality of input and/or output fields 14 that are adjacent to the text fields 12. Fields 14 may allow to input and/or output information in relation to the text indicated in each text field 12. In the example of FIG. 1, a number "85422141" is displayed in an input and/or output field 14' adjacent a text field 12' displaying the text "Tarifnummer" (tariff number).

In the lower portion of screen view 10 of FIG. 1, a frame 16 is provided including further text fields 18 and further input and/or output fields 20.

Screen view 10 can further include a screen element 22 configured as a drop down list box. Screen element 22 may have a control button 24, activation of which (such as by a mouse pointer device) can cause the drop down list box to drop down. In the example shown in FIG. 1, the drop down list box 22 is closed and reveals only a first row of text from among a plurality rows of text included in the drop down list box 22.

Figure 2:
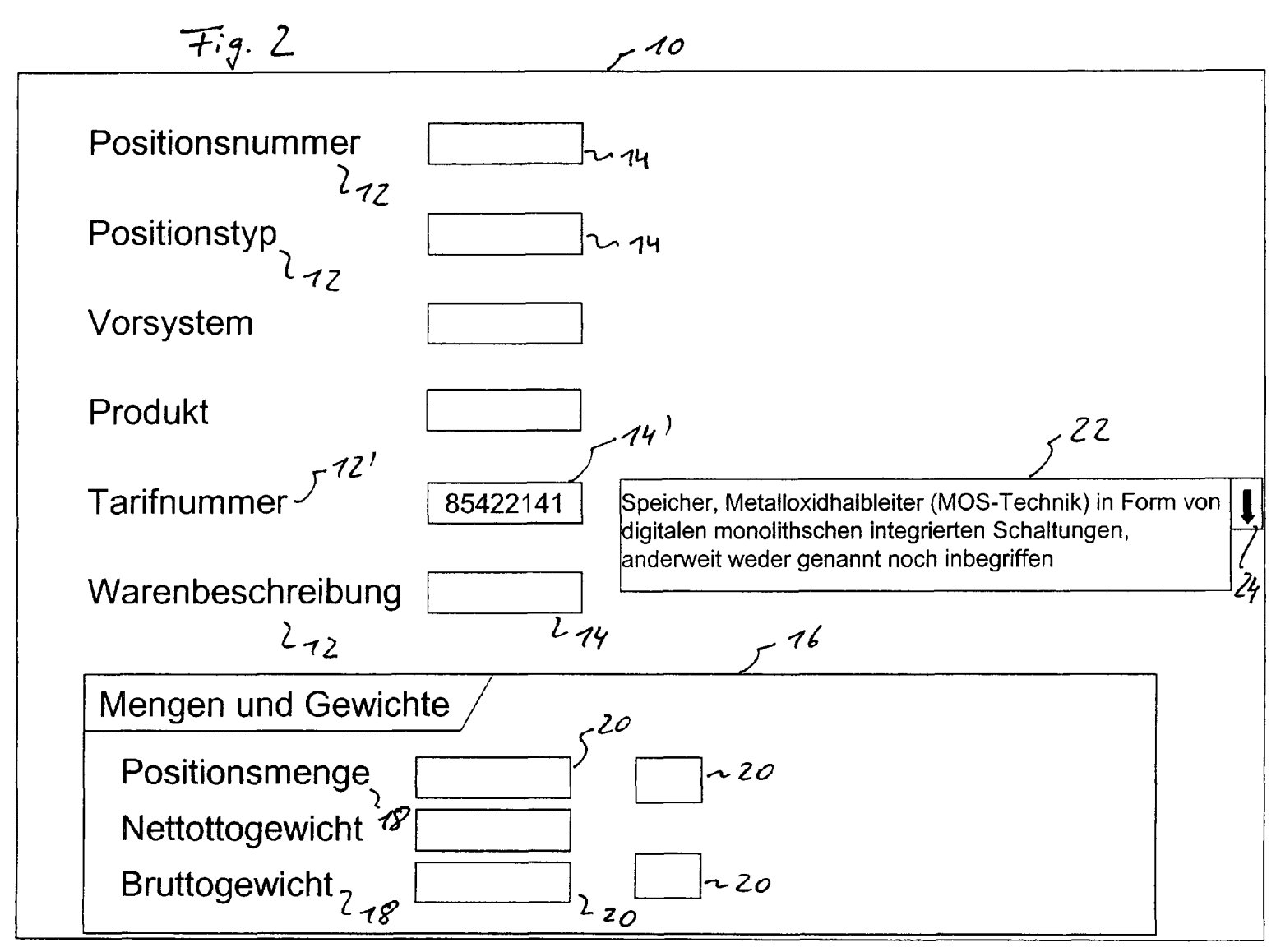

FIG. 2 illustrates exemplary screen view 10 after activation of control button 24. Drop down list box 22 is unfolded and can display all the rows of text included in drop down list box 22. In the example illustrated in FIG. 2, the drop down list box 22 includes three rows of text altogether.

Drop down list box 22 can be configured to allow output of information, but no data input. Thus, any selection function enabling the user to select among the rows of text displayed in drop down list box 22 may be disabled. This can be achieved, e.g., by overriding a static screen input attribute of screen element 22 so as to set it to "0" (input inhibited).

Exemplary screen view 10a shown in FIGS. 3 and 4 is in the form of a table view and includes, in addition to a plurality of text fields 12a and a corresponding plurality of input and/or output fields 14a, a drop down list box 22a adjacent each input and/or output field 14a. While FIG. 3 illustrates drop down list boxes 22a as being closed with only their first row of text visible, FIG. 4 illustrates a drop down list box 22a' associated with an input and/or output field 14a' as being unfolded to display all rows of text (in the illustrated example, three rows of text) included in this drop down list box 22a'.

FIG. 5 depicts a flow chart of an exemplary method, consistent with an embodiment of the present invention. In the example of FIG. 5, a screen element to be used for displaying text in multiple lines can be given the attributes of a drop down list box (step S100). Each field of the drop down list box can be identifiable by a key, which can be made visible in addition to the text fields of the box. However, the attributes of the drop down list box may be set in step S100 so that the key assigned to each text field is invisible.

In step S110, the entire text to be displayed in the drop down list box may be retrieved from a data repository and, if necessary, portioned into a plurality of text portions each of a size to fit in a respective text field of the drop down list box. The data repository may, e.g., be a database having one or more database tables with each database table having one or more rows. The text to be displayed may be distributed across several such rows. The text portion in each row may be suitably sized to fit in a field of the drop down list box. In such a scenario, portioning of the text retrieved from the data repository may be obviated as the text is already available in a suitably portioned form. In other embodiments, the text from the data repository may have to be divided into suitably sized segments before writing or displaying the segments in the drop down list box. This may, e.g., be the case where the text is retrieved from a text file.

In step S120, the text portions are brought, if necessary, into their correct order and each can be assigned a consecutive number to identify the desired location of the text portion in the text. Thereafter, the text portions and the assigned numbers may be stored in a buffer table (step S130). The numbers in the buffer table can allow to write the text portions to the correct fields in the drop down list box. The numbers thus may serve as pointers to the text fields of the drop down list box.

The buffer table with its included information can be subsequently input to a function module operable to make this information available to the drop down list box (step S140). On each execution of a software application program calling for display of the drop down list box, the box can be displayed with only its first text field visible (step S150). The remaining text fields of the box can be made visible through unfolding the box.

Figure 6:
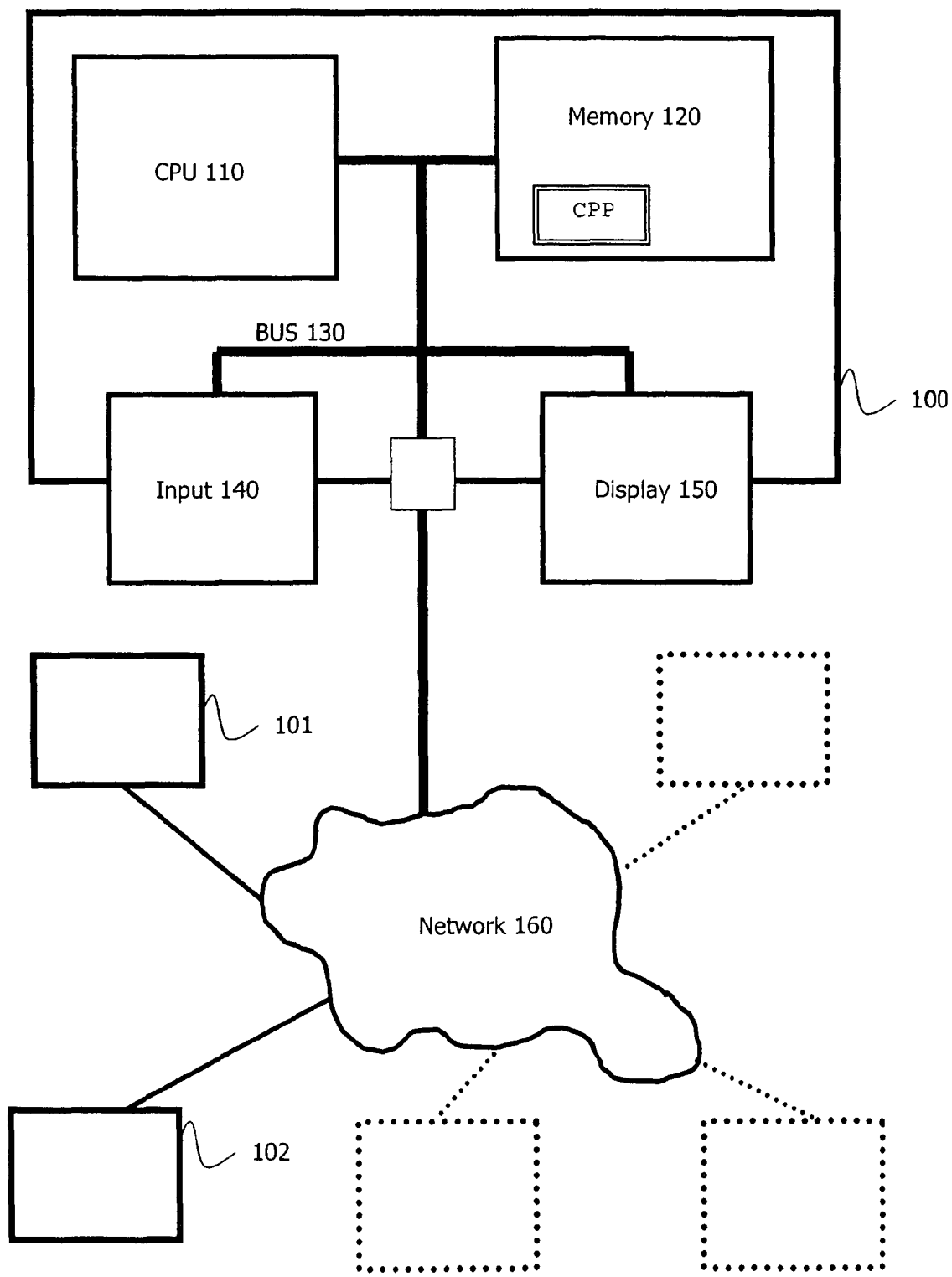
FIG. 6 schematically illustrates an exemplary data processing system that may provide a suitable computer environment for implementing methods consistent with the present invention.

FIG. 6 illustrates a simplified block diagram of an exemplary computer system in which methods consistent with embodiments of the present invention can be practiced. The computer system comprises a computer 100 which includes a processor 110 (such as a CPU), a memory 120, a bus system 130, one or more input devices 140 (such as a keyboard and/or a pointer device) and a display device 150.

Computer 100 may be coupled via a network 160 to one or more further computers 101, 102, . . . , which each have a processor and memory similar to computer 100 and may optionally have input and/or output devices. One or more of the computers of the computer system may operate as client computers, while one or more other computers of the system may operate as server computers. Computer 100 and/or one or more other computer of the computer system may, e.g., be a conventional personal computer (PC), a desktop computer, a hand-held device, a multiprocessor computer, a microprocessor-based or programmable consumer electronics device, a minicomputer, a mainframe computer, a personal mobile computing device, a mobile telephone, a portable or stationary personal computer, a palmtop computer or the like.

Embodiments of the present invention may be embodied as a computer program product (CPP) operable to generate program signals, which may be collectively referred to as a "program." The program generated by the CPP may be executed, in whole or in part, by any processor of the computer system. The CPP may reside on an external program carrier (such as a CD-ROM) and/or in memory of one or more of the computers 100, 101, 102, . . . . The CPP comprises program instructions and, optionally, data or variables that cause the executing processor, such as 110, to carry out steps forming part of the methodology of the present invention. The CPP can be available as source code in any programming language, and as object code ("binary code") in a compiled presentation.

The CPP may include program code effective to create, on a display device (such as 150), a graphical user interface (GUI) including the screen views, such as screen views 10 and 10a shown in the previous figures. Although the CPP is illustrated as being stored in memory 120 of computer 100, it can be located anywhere else in the computer system.

While the invention has been described with reference to exemplary embodiments, those skilled in the art will understand that various changes may be made and equivalents may be substituted without departing from the scope of the invention. In addition, many modifications may be made to adapt a particular step or structure to the teachings of the invention without departing from its scope. Therefore, it is intended that the invention not be limited to the particular embodiments disclosed, but that the invention will include all embodiments falling within the scope of the appended claims.

Accordingly, other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

What is claimed is:

1. A method of displaying textual information stored in a data repository on a screen displayed on a display device of a computer system, the method comprising the steps of:
   entering data into a field;
   dividing textual information associated with the data entered into the field into portions of the textual information;
   configuring a drop down list box for displaying the divided textual information so as to suppress screen input to the drop down list box and to suppress highlighting of the portions of the textual information that are displayed in the respective fields of the drop down list box;
   assigning the portions of the textual information to respective fields of the drop down list box so that the divided textual information is displayed;
   displaying, on the display device, the drop down list box on the screen so that a first portion of the textual information is visible in a first field of the drop down list box, wherein suppressing the screen input prevents selection of the portions of the textual information that is displayed in the respective fields of the drop down list box;
   arranging the portions of the textual information in a consecutive order by assigning consecutive numbers to the portions, each consecutive number indicating a location of a corresponding portion within the textual information; and
   storing the portions and the consecutive numbers in a table, wherein the consecutive numbers are used as pointers to assign the portions to the respective fields of the drop down list box.

2. The method of claim 1, wherein the configuring step includes the step of deactivating a screen input attribute of the drop down list box, wherein the screen input attribute, when activated, is effective to allow screen input to the drop down list box.

3. The method of claim 2, wherein the screen input attribute is a static attribute and the deactivating step includes repeatedly deactivating the screen input attribute on each creation of the screen.

4. The method of claim 1, further comprising the steps of:
   providing a buffer table associated with the drop down list box;
   retrieving the textual information from the data repository;
   storing the textual information in the buffer table so that each portion of the textual information is stored in a respective different line of the buffer table;
   assigning a key to each line of the buffer table; and
   assigning each key to a respective field of the drop down list box.

5. The method of claim 1, wherein configuring the drop down list box includes configuring attributes of the drop down list box, the attributes comprising:
   a required attribute activated to prevent a user from closing the screen until input fields displayed on the screen have been filled by the user;
   an input attribute defining whether a first element of the screen allows input from the user;
   an output attribute defining whether the first element of the screen is allowed to output information;
   an intensified attribute activated to highlight content displayed on the screen;
   an invisible attribute activated to render a second element of the screen invisible; and
   an active attribute defining whether the first or second element of the screen active, wherein when the active attribute is deactivated the active attribute overrides contradictory values of the input, output, and invisible attributes.

6. A computer-implemented system for displaying textual information, the system comprising:
   a data repository storing the textual information;
   a display device including a screen for displaying the textual information; and
   a data processor executing program code to carry out a method of displaying textual information, the method comprising the steps of:
   receiving data entered into a field;
   dividing the textual information into portions of the textual information, wherein the textual information is associated with the data entered into the field;
   configuring a drop down list box for displaying the divided textual information so as to suppress screen input to the drop down list box and to suppress highlighting of the portions of the textual information that are displayed in the respective fields of the drop down list box;
   assigning the portions of the textual information to respective fields of the drop down list box so that the divided textual information is displayed;
   displaying, on the display device, the drop down list box on the screen so that a first portion of the textual information is visible in a first field of the drop down list box, wherein suppressing the screen input prevents selection of the portions of the textual information that is displayed in the respective fields of the drop down list box;
   arranging the portions of the of the textual information in a consecutive order by assigning consecutive numbers to the portions, each consecutive number indicating a location of a corresponding portion within the textual information; and
   storing the portions and the consecutive numbers in a table, wherein the consecutive numbers are used as pointers to assign the portions to the respective fields of the drop down list box.

7. The system of claim 6, wherein the configuring step includes the step of deactivating a screen input attribute of the drop down list box, wherein the screen input attribute, when activated, is effective to allow screen input to the drop down list box.

8. The system of claim 7, wherein the screen input attribute is a static attribute and the deactivating step includes repeatedly deactivating the screen input attribute on each creation of the screen.

9. The system of claim 6, wherein the method further comprises the steps of:
   providing a buffer table associated with the drop down list box;
   retrieving the textual information from the data repository;
   storing the textual information in the buffer table so that each portion of the textual information is stored in a respective different line of the buffer table;
   assigning a key to each line of the buffer table; and
   assigning each key to a respective field of the drop down list box.

10. The system of claim 6, wherein configuring the drop down list box includes configuring attributes of the drop down list box, the attributes comprising:
    a required attribute activated to prevent a user from closing the screen until input fields displayed on the screen have been filled by the user;

an input attribute defining whether a first element of the screen allows input from the user;

an output attribute defining whether the first element of the screen is allowed to output information;

an intensified attribute activated to highlight content displayed on the screen;

an invisible attribute activated to render a second element of the screen invisible; and an active attribute defining whether the first or second element of the screen active, wherein when the active attribute is deactivated the active attribute overrides contradictory values of the input, output, and invisible attributes.

11. A memory device of a computer system storing a computer program product, comprising program code arranged to cause a processing means of a computer system to carry out a method of displaying textual information stored in a data repository on a screen displayed on a display device of the computer system, the method comprising the steps of:

entering data into a field;

dividing textual information associated with the data entered into the field into portions of the textual information;

configuring a drop down list box for displaying the divided textual information so as to suppress screen input to the drop down list box and to suppress highlighting of the portions of the textual information that are displayed in the respective fields of the drop down list box;

assigning the portions of the textual information to respective fields of the drop down list box so that the divided textual information is displayed;

displaying, on the display device, the drop down list box on the screen so that a first portion of the textual information is visible in a first field of the drop down list box, wherein suppressing the screen input prevents selection of the portions of the textual information that is displayed in the respective fields of the drop down list box;

arranging the portions of the textual information in a consecutive order by assigning consecutive numbers to the portions, each consecutive number indicating a location of a corresponding portion within the textual information; and storing the portions and the consecutive numbers in a table, wherein the consecutive numbers are used as pointers to assign the portions to the respective fields of the drop down list box.

12. The memory device of claim 11, wherein the configuring step includes the step of deactivating a screen input attribute of the drop down list box, wherein the screen input attribute, when activated, is effective to allow screen input to the drop down list box.

13. The memory device of claim 12, wherein the screen input attribute is a static attribute and the deactivating step includes repeatedly deactivating the screen input attribute on each creation of the screen.

14. The memory device of claim 11, wherein the method further comprises the steps of:

providing a buffer table associated with the drop down list box;

retrieving the textual information from the data repository;

storing the textual information in the buffer table so that each portion of the textual information is stored in a respective different line of the buffer table;

assigning a key to each line of the buffer table; and assigning each key to a respective field of the drop down list box.

15. The memory device of claim 11, wherein configuring the drop down list box includes configuring attributes of the drop down list box, the attributes comprising:

a required attribute activated to prevent a user from closing the screen until input fields displayed on the screen have been filled by the user;

an input attribute defining whether a first element of the screen allows input from the user;

an output attribute defining whether the first element of the screen is allowed to output information;

an intensified attribute activated to highlight content displayed on the screen;

an invisible attribute activated to render a second element of the screen invisible; and an active attribute defining whether the first or second element of the screen active, wherein when the active attribute is deactivated the active attribute overrides contradictory values of the input, output, and invisible attributes.

* * * * *